Dec. 17, 1968  S. G. Y. GAMER  3,416,776
DEVICE FOR AERATING, PREFERABLY, WASTE WATER
Filed July 9, 1965
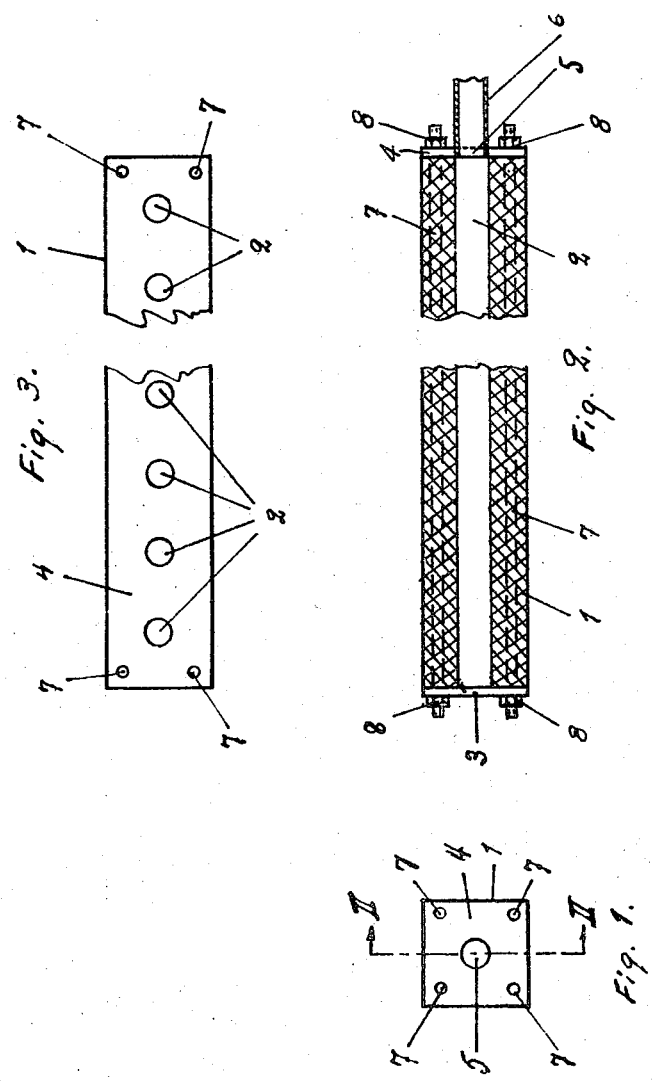

3,416,776
DEVICE FOR AERATING, PREFERABLY, WASTE WATER
Sven Gustaf Yngve Gamer, Norrkoping, Sweden, assignor to Stenberg-Flygt Aktiebolag, Solna, Sweden
Filed July 9, 1965, Ser. No. 470,681
Claims priority, application Sweden, July 23, 1964, 8,951/64
3 Claims. (Cl. 261—122)

ABSTRACT OF THE DISCLOSURE

A waste water aerating device having an air chamber surrounded by a porous member of soft cellular plastic having open cells and a pair of end plates. The total weight of the device is greater than the weight of the water displaced by it.

---

For aerating waste water, a known method consists in blowing in air through various dispersing means into the water contained in a cistern, preferably at, or near, the bottom of the cistern in order to oxygenate and oxidise the organic matters contained in the water.

For that purpose, tubes, boxes and the like, have preferably been used which were provided with a great number of perforations and into which air was blown. The air flowing out through the perforations thus forms bubbles, the size of which is determined by the diameter of the perforations. Since it is desirable that the air is dispersed into a great number of small bubbles, perforations with a small diameter and, in certain cases, porous ceramic plates have been used.

Experience has, however, shown that the impurities contained in the water and particularly the mucilage forming microorganisms living on these impurities have a tendency to clog the perforations and the pores in the ceramic plates, the latter becoming unusable, since the pores cannot be cleared, which on the contrary is the case with the perforations, the cleaning of the latter being very expensive, however.

The present invention relates to a device by means of which this drawback is eliminated.

The device according to the invention is characterized in that it consists of blocks of soft or semisoft cellular plastic with open cells, these blocks being immersed in water and provided with at least one preferably cylindrical recess connected to a compressed air source so that air is pressed out through the cells and dispersed in a very large number of extremely small air bubbles.

Experience has in fact shown, surprisingly enough, that these cells do not get clogged, or that any blockages which do occur can easily be removed by making the air supply intermittent. This phenomenon occurs because the pores in the cellular blocks expand when the device is subjected to over-pressure and contract when the air is shut off. The pores are thus automatically kept free from mucilage and other impurities.

A preferred embodiment of the device according to the invention is characterized in that the block is provided with plane ends perpendicular to the recesses, and that it is clamped between comparatively heavy end-plates, preferably by means of bolts or tie rods inserted through holes in the block so that the weight of the air-filled block is greater than that of the displaced water and so that the block has no tendency to float.

A preferred embodiment of the device according to the invention is characterized in that the block or the blocks cover the major part of the bottom of a processing tank.

The invention is described below in more detail reference being made to the attached drawing in which:
FIG. 1 shows an embodiment of a device according to the invention seen from one of the ends,
FIG. 2 shows a sectional view through the same embodiment along the line II—II in FIG. 1, and
FIG. 3 shows another embodiment seen from one of its ends.

Embodiment I, FIGURES 1 and 2

A block 1 in the form of a rectangular parallelepiped of soft or semisoft cellular plastic with open cells and with preferably a square cross section is provided with a longitudinal, central, cylindrical recess 2. Both ends of the block 1 are covered by plates 3, 4 of which one 4 is provided with a central hole 5 corresponding to the recess 2, in which hole a tube 6 connected to a compressed air source is fitted. The plates 3, 4 are clamped against the ends of the block 1 by means of bolts 7 inserted through holes in the block 1 and nuts 8 fitted to the bolts 7.

Embodiment II, FIG. 3

This embodiment differs from the one described above, in that the block 1 has a rectangular cross section, and that it is provided with several recesses 2 arranged side by side and parallel to each other, and connected to the compressed air source.

The plates 3, 4 and the bolts 7 are preferably so heavy that their weight is greater than that of the water displaced by the air-filled block 1.

When compressed air is admitted to the recesses 2 of the block 1 immersed in water, the air will penetrate through the cells of the block 1 and escape in the form of a very great number of extremely small bubbles which are partially dissolved in water until the water is saturated with air.

In certain cases it is very suitable to arrange the block, or the blocks, so that they cover the major part of the bottom of a processing tank.

Although only two embodiments have been shown and described above, other embodiments may also be comprised within the scope of the invention.

What I claim is:
1. A submerged device for aerating waste material for use in conjunction with a source of compressed air comprising:
    (a) a porous member of soft cellular plastic having open cells;
    (b) an air chamber enclosed by said porous member; and
    (c) means connecting said air chamber to said source of compressed air whereby air will be forced out of said chamber through the pores and dispersed in a very large number of extremely small bubbles.
2. A submerged device for aerating waste material as defined in claim 1 wherein the cells of said porous member will expand when subjected to over-pressure and contract when the pressure is lowered, whereby automatically keeping the pores free from mucilage and other impurities.
3. A submerged device for aerating waste material as defined in claim 1 wherein said air chamber has a cylindrical shape, the plane ends thereof being closed by a pair of end-plates clamped to said porous member, the total weight of said device when air-filled being greater than that of the water displaced, thereby eliminating the need to firmly secure said device to the bottom of a waste material processing tank.

References Cited

UNITED STATES PATENTS

| | | | |
|---|---|---|---|
| 531,356 | 12/1894 | Barns | 261—121 |
| 1,403,578 | 1/1922 | Sweetland | 261—121 |
| 1,521,143 | 12/1924 | Weber | 261—121 |
| 1,660,155 | 2/1928 | Dyer | 261—121 |
| 1,849,146 | 3/1932 | Kraut | 261—122 |
| 1,885,785 | 11/1932 | Thomson | 261—122 |

HARRY B. THORNTON, *Primary Examiner.*

T. R. MILES, *Assistant Examiner.*

U.S. Cl. X.R.

210—220